F. T. CRICHTON.
NEGOTIABLE INSTRUMENT.
APPLICATION FILED JUNE 24, 1913.

1,089,113.

Patented Mar. 3, 1914.

WITNESSES:
Charles E. Finck
Helen M. Byrne

INVENTOR.
Fred Taylor Crichton.
BY
William J. Jackson
ATTORNEY.

UNITED STATES PATENT OFFICE.

FRED T. CRICHTON, OF PHILADELPHIA, PENNSYLVANIA, ASSIGNOR OF ONE-FOURTH TO HENRY ENEU JOHNSON, OF YEADON, PENNSYLVANIA.

NEGOTIABLE INSTRUMENT.

1,089,113.

Specification of Letters Patent.  Patented Mar. 3, 1914.

Application filed June 24, 1913. Serial No. 775,591.

*To all whom it may concern:*

Be it known that I, FRED TAYLOR CRICHTON, a citizen of the United States, residing at Philadelphia, in the county of Philadelphia and State of Pennsylvania, have invented a certain new and useful Negotiable Instrument, of which the following is a specification.

This invention has for its principal object the providing of a negotiable instrument in the form of a combined envelop and bill of exchange, the envelop being designed to contain a policy of insurance, certificate of stock bonds and like documents, the bill of exchange being separably attached to the envelop, whereby, for instance, an insurance company transacting business with an out-of-town broker, may send through a bank for collection such instrument, thereby insuring prompt payment of the policy premium and whereby when payment has been made by the proper parties, the bill of exchange may be detached for filing purposes and the envelop containing the policy of the insurance filed in some appropriate place.

Other and further objects of the present invention reside in the providing of a negotiable instrument of the class described possessed of certain new and novel combinations of parts and in the providing of certain details of construction and arrangement of parts as will hereinafter appear.

Figure 1:
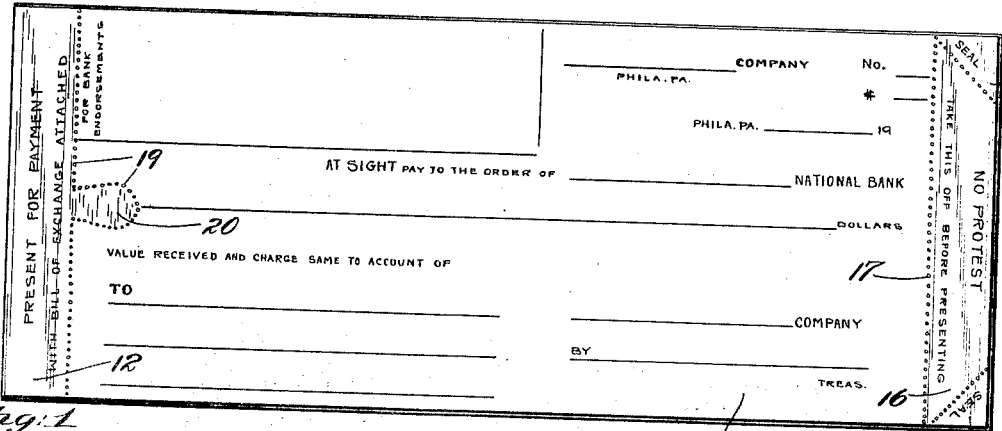
Figure 2:
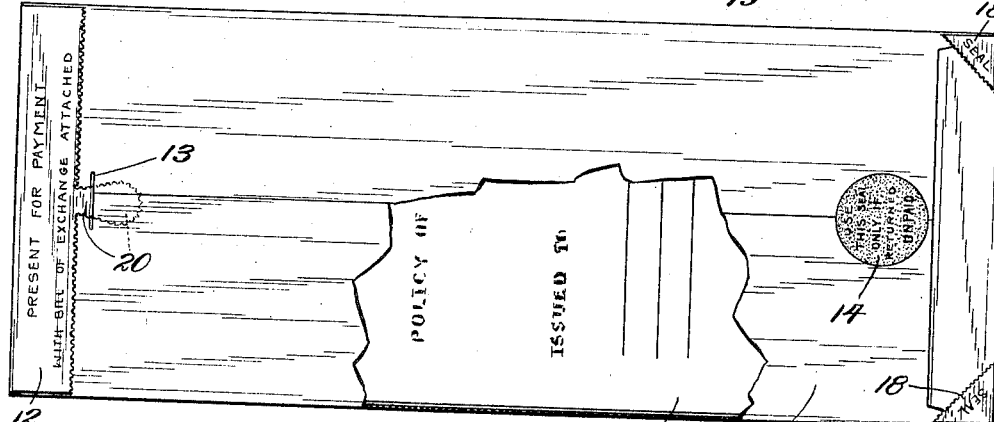
Figure 3:
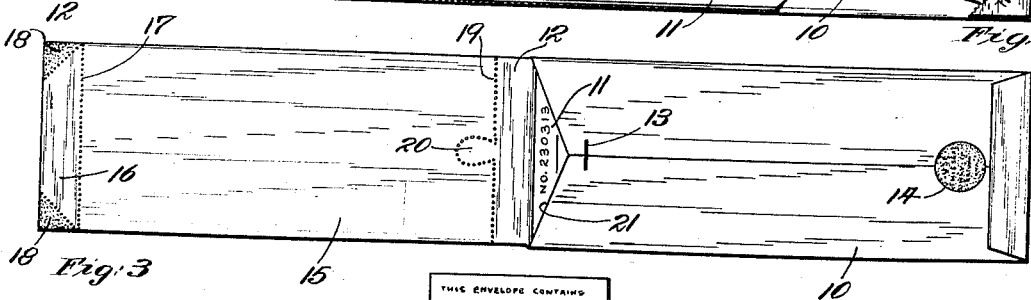
Figure 4:
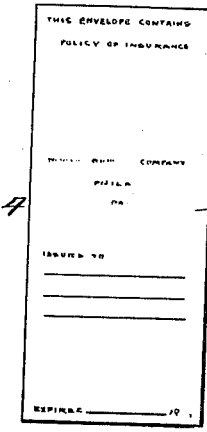

The nature, characteristic features and scope of the invention will be more fully understood from the following description taken in connection with the accompanying drawings forming part hereof and in which:

Figure 1, is a face view of the bill of exchange side of the negotiable instrument embodying the invention; Fig. 2, is a similar view with the bill of exchange detached, the envelop being partially broken away, Fig. 3, is a similar view drawn to a reduced scale and illustrating the bill of exchange folded back from the envelop, and Fig. 4, is a face view of the envelop side of the negotiable instrument.

The negotiable instrument of the present invention, is adapted to be used by business men transacting business at a distance, wherein property or valuable papers are being transferred for consideration. The negotiable instrument is so designed, that deeds, assignments, options, certificates and like documents, may be sent through a bank to collect the consideration. While, obviously, the instrument of the present invention may be used in connection with varied business interests, mention may be made of the insurance business, as an illustration. Let it be assumed that the insurance company is forwarding to an out-of-town broker a policy of insurance upon which a premium is due upon delivery of the policy. The company forwards through a bank the policy of insurance sealed within the combined envelop and bill of exchange, as shown in Fig. 1, of the drawings. The bank removes the no protest notice forming part of the bill of exchange, inspects the policy of insurance and presents the instrument as a whole for payment. Payment being made, the bank forwards same to the insurance company, thereby insuring the company of a safe, reliable and prompt method of receiving its premium. The policy holder detaches the bill of exchange for filing purposes and the envelop containing the policy of insurance, may be readily filed as is customary in such matters.

Taking up now the specific construction of the instrument as shown in the drawings, 10 designates an elongated envelop designed to contain a policy of insurance 11, or other suitable document. The envelop 10, is provided at one of its shorter ends with a closure flap 12, and immediately adjacent the closure flap 13, the inner face of the envelop is slit as at 13, for a purpose which will presently appear. At the opposite end of the envelop 10, the inner face thereof is provided with an adhesive 14, the purpose of which will also presently appear. Shown as being a continuation of the closure flap 12, is a bill of exchange 15, including its complemental no protest strip 16, which is shown at the free end of the bill of exchange. This no protest strip 16, is separably connected to the bill of exchange by a line of perforations 17. The underside of the strip 16, is provided preferably at the corners thereof with seals 18, of adhesive material. The bill of exchange 15, is separably attached to the closure flap 12, by means of a line of perforations 19, so designed that when the bill of exchange is detached from the envelop proper a tab 20, is present adapted for insertion through the slit 13, of the envelop 10, for temporarily closing the open end 21, of the envelop 10. As clearly shown in Figs. 1 and 3, the bill of exchange is of substantially the same dimensions, as the envelop 10, so that said bill of exchange completely covers the inner face of the envelop 10. Should it happen that the bill of exchange is for any reason not accepted, the adhesive seal 14, may be moistened and the bill of exchange temporarily secured to place and the instrument as a whole returned to the original sender.

By the above described arrangement and construction of parts, a neat, simple, practical and thoroughly efficient method of the delivery of documents and the payment of the consideration passing, effected promptly and without possible loss to the sender. The combined envelop and bill of exchange present a neat appearance, have no bulky parts and the instrument as a whole is therefore flat and may be readily transmitted.

What I claim is:

In a negotiable instrument, an envelop for containing documents or instruments in writing, said envelop having a tab insertion slit in its back, and having secured adjacent its open end, a combined bill of exchange, closure flap and no-protest strip, which combined parts are of a size sufficient to cover the envelop back, the bill of exchange being separably attached at one end to the closure flap by a line of perforations, designed to form a tab for the closure flap for coöperation with the tab insertion slit to close the envelop opening when the bill of exchange is detached along said line of perforations, the opposite end of the bill of exchange having separably attached thereto by a line of perforations the no-protest strip, the under face of which strip is provided with seals of adhesive material for temporarily securing said combined parts to the envelop back.

In testimony whereof, I have hereunto signed my name.

FRED T. CRICHTON.

Witnesses:
WILLIAM J. JACKSON,
HELEN M. BYRNE.